(12) United States Patent
Bhat et al.

(10) Patent No.: US 9,965,639 B2
(45) Date of Patent: May 8, 2018

(54) SOURCE AUTHENTICATION OF A SOFTWARE PRODUCT

(71) Applicant: International Business Machines Corporation, Armonk, NY (US)

(72) Inventors: Badekila Ganesh Prashanth Bhat, Bangalore (IN); Nageswararao V. Gokavarapu, Bangalore (IN); John Kurian, Bangalore (IN); Raghavendran Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 14/801,967

(22) Filed: Jul. 17, 2015

(65) Prior Publication Data
US 2017/0017798 A1    Jan. 19, 2017

(51) Int. Cl.
*G06F 21/62* (2013.01)
*G06F 21/44* (2013.01)

(52) U.S. Cl.
CPC .......... *G06F 21/6209* (2013.01); *G06F 21/44* (2013.01)

(58) Field of Classification Search
CPC ..................... G06F 21/6209; G06F 21/44
See application file for complete search history.

(56) References Cited

U.S. PATENT DOCUMENTS

| | | | | |
|---|---|---|---|---|
| 5,781,629 A * | 7/1998 | Haber | ............... | H04L 9/3236 380/28 |
| 6,151,708 A * | 11/2000 | Pedrizetti | ............... | G06F 8/65 717/173 |
| 6,377,589 B1 * | 4/2002 | Knight | ............... | G08B 26/00 340/506 |
| 6,393,420 B1 * | 5/2002 | Peters | ............... | G06F 17/3089 |
| 6,457,170 B1 | 9/2002 | Boehm et al. | | |
| 6,915,302 B1 * | 7/2005 | Christofferson | .. | G06F 17/30097 |
| 6,931,549 B1 * | 8/2005 | Ananda | ............... | G06F 21/62 713/150 |
| 7,032,240 B1 * | 4/2006 | Cronce | ............... | G06F 21/34 705/51 |
| 7,290,288 B2 * | 10/2007 | Gregg | ............... | G06F 21/335 705/51 |

(Continued)

FOREIGN PATENT DOCUMENTS

CN    102945241 A * 2/2013 ............... G06F 8/71

OTHER PUBLICATIONS

CN102945251A Translation.*
"Trusted Software Check"; An IP.com Prior Art Database Technical Disclosure; IP.com No. 000226292; Mar. 26, 2013; pp. 1-3.

*Primary Examiner* — Luu Pham
*Assistant Examiner* — James J Wilcox
(74) *Attorney, Agent, or Firm* — Alexa L. Ashworth; Brian M. Restauro

(57) ABSTRACT

Embodiments of the present invention provide systems and methods for authenticating the source code of a software end product. The method includes generating a compound key, which is composed of a set of unique keys generated from a source file. A set of files are separately build based on a received source code, and a key generated and embedded into the files at the time of the build. A validation tool is used to compare the values of the generated compound key to the values of the embedded key to determine if the values match.

11 Claims, 3 Drawing Sheets

(56) References Cited

U.S. PATENT DOCUMENTS

| | | | |
|---|---|---|---|
| 7,373,345 B2* | 5/2008 | Carpentier | G06F 17/30097 |
| 7,774,320 B1* | 8/2010 | Day | G06F 11/0751 |
| | | | 707/690 |
| 7,802,087 B2 | 9/2010 | Gatto et al. | |
| 8,527,979 B2* | 9/2013 | Wookey | G06F 8/68 |
| | | | 717/169 |
| 8,667,273 B1* | 3/2014 | Billstrom | G06F 21/6209 |
| | | | 713/165 |
| 8,838,964 B2 | 9/2014 | Gregorovic et al. | |
| 8,983,870 B2* | 3/2015 | Krzystofczyk | G06F 8/63 |
| | | | 705/51 |
| 8,984,293 B2* | 3/2015 | Layson | G06F 21/121 |
| | | | 380/277 |
| 9,336,389 B1* | 5/2016 | Okereke | G06F 21/56 |
| 2003/0216172 A1* | 11/2003 | LeMay | G06F 21/57 |
| | | | 463/29 |
| 2004/0044996 A1* | 3/2004 | Atallah | G06F 8/71 |
| | | | 717/169 |
| 2004/0123102 A1* | 6/2004 | Gehrmann | H04L 9/3242 |
| | | | 713/161 |
| 2004/0210883 A1* | 10/2004 | Diedrich | G06F 8/54 |
| | | | 717/145 |
| 2005/0144599 A1* | 6/2005 | Styles | G06F 11/3624 |
| | | | 717/140 |
| 2005/0188214 A1* | 8/2005 | Worley | G06F 21/52 |
| | | | 713/187 |
| 2005/0257205 A1* | 11/2005 | Costea | G06F 8/65 |
| | | | 717/168 |
| 2006/0015746 A1* | 1/2006 | Kusudo | H04N 7/1675 |
| | | | 713/187 |
| 2006/0101408 A1* | 5/2006 | Kotamarthi | G06F 21/52 |
| | | | 717/126 |
| 2006/0161761 A1* | 7/2006 | Schwartz | G06F 21/52 |
| | | | 711/216 |
| 2007/0005992 A1* | 1/2007 | Schluessler | G06F 21/54 |
| | | | 713/193 |
| 2008/0104403 A1* | 5/2008 | Gueron | G06F 21/64 |
| | | | 713/176 |
| 2009/0031170 A1* | 1/2009 | Tsurumi | G06F 11/3696 |
| | | | 714/38.14 |
| 2009/0055658 A1* | 2/2009 | Hyser | G06F 21/575 |
| | | | 713/189 |
| 2009/0287473 A1* | 11/2009 | Bull | G06F 8/60 |
| | | | 704/8 |
| 2010/0062844 A1* | 3/2010 | Crowder, Jr. | G06F 21/57 |
| | | | 463/29 |
| 2010/0299315 A1* | 11/2010 | Gosnell | G06F 17/30067 |
| | | | 707/690 |
| 2011/0214188 A1 | 9/2011 | Collberg et al. | |
| 2011/0283085 A1* | 11/2011 | Dilger | G06F 11/1004 |
| | | | 711/216 |
| 2013/0103651 A1* | 4/2013 | Jha | G06F 17/30097 |
| | | | 707/687 |
| 2013/0151861 A1* | 6/2013 | Gan | G06F 21/125 |
| | | | 713/189 |
| 2014/0013390 A1* | 1/2014 | Sade | G06F 21/42 |
| | | | 726/3 |
| 2015/0033202 A1 | 1/2015 | Wilson et al. | |
| 2015/0161153 A1* | 6/2015 | Gheith | G06F 17/30091 |
| | | | 707/695 |
| 2016/0253769 A1* | 9/2016 | Waldhalm | G06Q 50/184 |
| | | | 726/32 |
| 2016/0285636 A1* | 9/2016 | Davoust | H04L 9/0819 |
| 2016/0380771 A1* | 12/2016 | Pepin | G06F 21/44 |
| | | | 713/187 |
| 2017/0031669 A1* | 2/2017 | Davis | G06F 8/61 |

* cited by examiner

SOURCE AUTHENTICATION OF A SOFTWARE PRODUCT

BACKGROUND OF THE INVENTION

The present invention relates generally to the field of software design, and more particularly to authenticating source code of a software product.

A typical life-cycle of software includes delivering the package to the customer as an installer pack and then delivering fix packs to the customer. Fix packs often include the bug fixes and other feature enhancements. Fix packs refer to a set of files, which have been altered from the base product that was given to the customer. Often, multiple fix packs are delivered for the same product, over a period of time.

Normal procedures of building fix packs and software products involve extracting the files from a central repository or multiple repositories, and building it on the applicable platforms on a build environment customized for the software. In addition to standard fix packs, there can also be customized fixes that get built and delivered to meet the specific needs of a particular customer. The complexity of the build process varies across software and it may be a common scenario to extract thousands of files for building the fix packs in larger software.

SUMMARY

According to one embodiment of the present invention, a method for authenticating source code is provided, the method comprising: receiving, by one or more processors, at least one source file; generating, by a key generator, a compound key, wherein the compound key comprises a set of keys generated from the at least one source file; building, by one or more processors, a set of files, based on a source code from the at least one source file; generating, by the key generator, a value associated with each file of the set of files; and comparing, by a key validation tool, the compound key and the value to determine if said compound key is equivalent to said value.

According to another embodiment of the present invention, a computer program product for authenticating source code is provided, the computer program product comprising: a computer readable storage medium and program instructions stored on the computer readable storage medium, the program instructions comprising: program instructions to receive at least one source file; program instructions to generate a compound key, wherein the compound key comprises a set of keys generated from the at least one source file; program instructions to build a set of files, based on a source code from the at least one source file; program instructions to generate a value associated with each file of the set of files; and program instructions to compare the compound key and the value to determine if said compound key is equivalent to said value.

According to another embodiment of the present invention, a system for authenticating source code is provided, the system comprising: one or more computer processors; one or more computer readable storage media; program instructions stored on the one or more computer readable storage media for execution by at least one of the one or more processors, the program instructions comprising: program instructions to receive at least one source file; program instructions to generate a compound key, wherein the compound key comprises a set of keys generated from the at least one source file; program instructions to build a set of files, based on a source code from the at least one source file; program instructions to generate a value associated with each file of the set of files; and program instructions to compare the compound key and the value to determine if said compound key is equivalent to said value.

DETAILED DESCRIPTION

A typical life-cycle of software includes delivering the package to the customer as an installer pack and then delivering fix packs to the customer. When a fix pack is delivered to the customer, incorrect or unauthorized files may sometimes be inadvertently included in the fix pack. Embodiments of the present invention provide systems and methods to generate a compound key during the extraction of a source code and to generate a separate key in each file during the build process, in order to validate that the delivered product matches the intended source, by comparing the generated compound key to the separately generated keys from each file.

Figure 1:
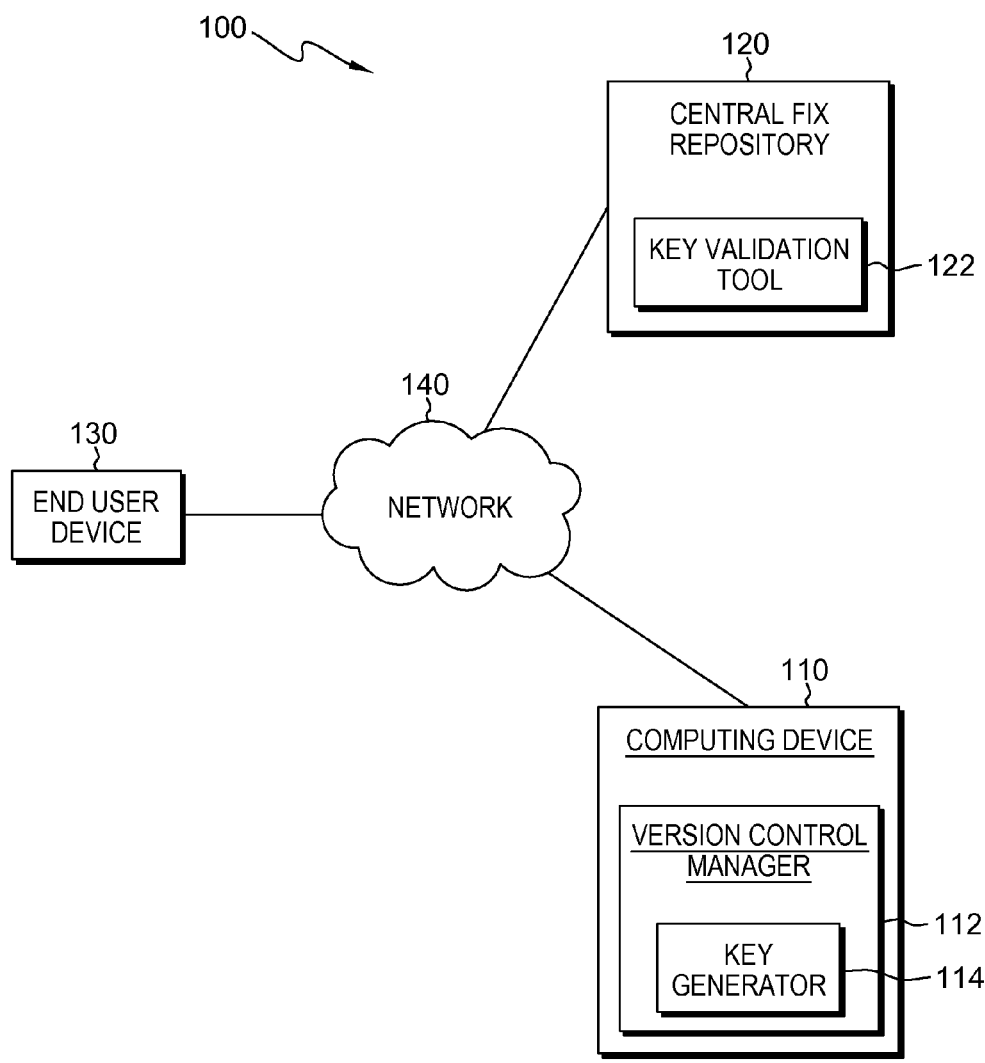
FIG. 1 depicts a block diagram illustrating a distributed product validation system, in accordance with an embodiment of the present invention.

The present invention will now be described in detail with reference to the Figures. FIG. 1 depicts a block diagram illustrating a distributed product validation system ("system"), generally designated 100, in accordance with an embodiment of the present invention. Modifications to system 100 may be made by those skilled in the art without departing from the scope of the invention as recited by the claims. In an exemplary embodiment, system 100 includes computing device 110, central fix repository 120, and end user device 130, all interconnected over network 140.

Network 140 can be, for example, a local area network (LAN), a wide area network (WAN) such as the Internet, or a combination of the two, and can include wired, wireless, or fiber optic connections. In general, network 140 can be any combination of connections and protocols that will support communication and/or access between computing device 110, central fix repository 120, and end user device 130.

Computing device 110 includes version control manager 112 and key generator 114. In various embodiments of the present invention, computing device 110 can be a laptop computer, a tablet computer, a netbook computer, a personal computer (PC), a desktop computer, a personal digital assistant (PDA), a smart phone, a thin client, or any programmable electronic device capable of executing computer readable program instructions. Computing device 110 may include internal and external hardware components, as depicted and described in further detail with respect to FIG. 4.

Version control manager 112 receives the source code from a developer and associates each source with a field to maintain a generated key. Version control manager 112 causes a compound key (composed of the unique keys of all of the sources) to be generated during source code extraction, during which a unique hash function is appended into the compound key. The hash function is later compared to the end product to ensure the customer receives the correct level of source code in the end product.

Key generator 114 is a component of the version control manager 112 which automatically generates a unique key for each of the received source files, responsive to a developer checking in the source code. The unique key can be based on the file name, file location, file size, the hash of the file, etc., such that any change in the source file will result in a change in the generated unique key. In this exemplary embodiment, key generator 114 generates a key during both the source code extraction and the build process. The key generated by key generator 114 is propagated across all of the source files.

Central fix repository 120 includes key validation tool 122. Central fix repository 120 may be a management server, a web server, or any other electronic device, or computing system capable of receiving and sending data. In other embodiments, central fix repository 120 can be a laptop computer, a tablet computer, a netbook computer, a personal computer (PC), a desktop computer, a personal digital assistant (PDA), a smart phone, or any programmable electronic device capable of communicating with computing device 110 and end user device 130 via network 140, and with various components and devices within system 100. In other embodiments, central fix repository 120 can represent a computing system utilizing clustered computers and components to act as a single pool of seamless resources when accessed through a network. In this exemplary embodiment, central fix repository 120 can store source code for building bug fixes. Central fix repository 120 can be accessed by end user device 130. Central fix repository 120 may include internal and external hardware components, as depicted and described in further detail with respect to FIG. 4.

Key validation tool 122 is a program supplied by the end product. Key validation tool 122 identifies and validates the built keys of the end product by validating the published compound key with the embedded keys in each binary. Key validation tool 122 scans the compound key, and for each entry in the compound key, key validation tool 122 searches for the entry in the binary files. If a match is found, the binary values are compared to validate the correctness.

End user device 130 can be a laptop computer, a tablet computer, a netbook computer, a personal computer (PC), a desktop computer, a personal digital assistant (PDA), a smart phone, a thin client, or any programmable electronic device capable of executing computer readable program instructions. In this exemplary embodiment, end user device 130 can access and install bug fixes from central fix repository 120. In some embodiments, a copy of key validation tool 122 resides on end user device 130, in order to validate a downloaded bug fix from central fix repository 120. In other embodiments of the present invention, many end user devices may be implemented in system 100. End user device 130 may include internal and external hardware components, as depicted and described in further detail with respect to FIG. 4.

Figure 2:
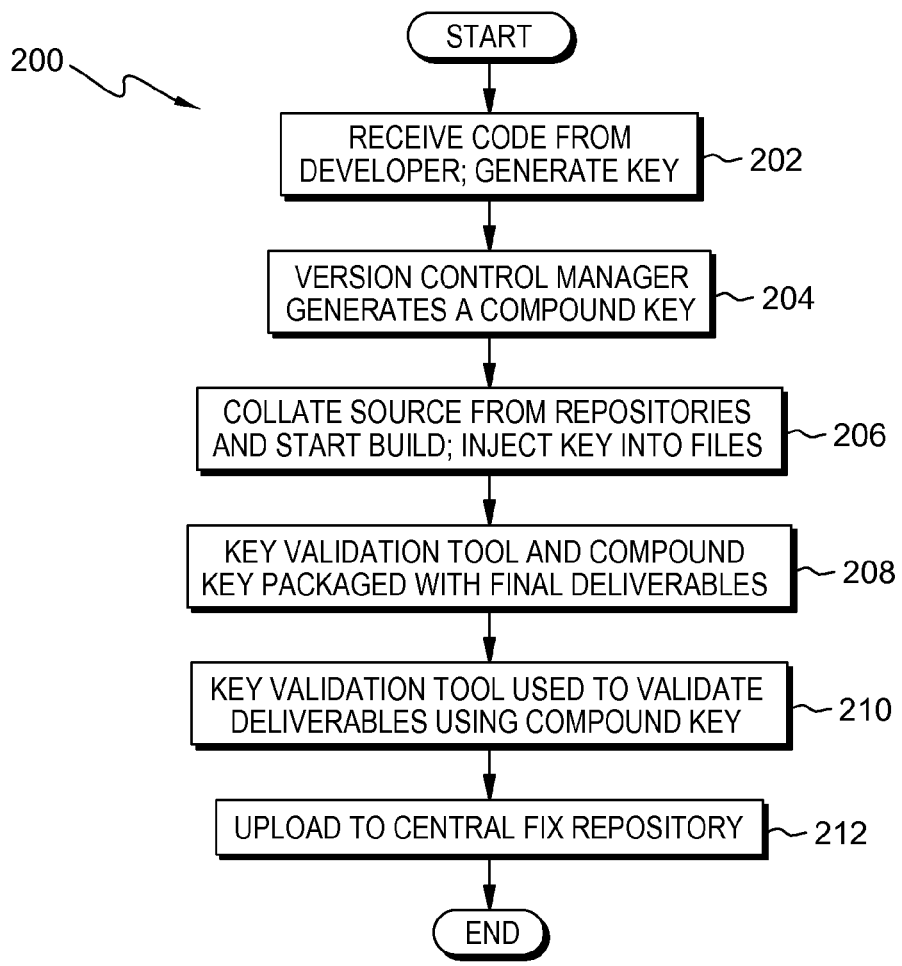
FIG. 2 depicts a flowchart illustrating operational steps of a product build and delivery process, in accordance with an embodiment of the present invention.

FIG. 2 depicts flowchart 200 illustrating operational steps of a product build and delivery process, in accordance with an embodiment of the present invention. Two example source files are used through FIG. 2: (1) src/abc.c (2) src/pqr.c. Source file src/abc.c builds into abc.o (i.e., object file) and src/pqr.c builds into pqr.o (i.e., object file). The two object files are combined to create a final binary executable: abcpqr.

In step 202, version control manager 112 receives the source code from the developer and generates a unique key. In this exemplary embodiment, in response to receiving the source code from a developer, version control manager 112 generates a unique key for the source file. Each source file has a reserved field. For example, using the above example source files (i.e., src/abc.c and src/pqr.c), the below example string is used as the field that is recognized by version control manager 112 and the later build system to embed values within the source files:

const char* file_key="<pathname><hashvalue><source file size>"

Each source code received from the developer is associated with a field in version control manager 112, in order to maintain the key. The key generated is propagated across all of the source files. The source code for building the fixes can be obtained from a single repository, multiple repositories, or repositories which operate in a cloud computing environment.

In step 204, version control manager 112 generates a compound key. In this exemplary embodiment, during a source code extraction process, version control manager 112 generates a compound key, which includes the unique keys generated from all of the source files (step 202). Specifically, during the source code extraction process, version control manager 112 adds a row into the generated compound key file, which includes both the source path and a value. The value is based on a hash function run on the source file and the size of the source file. The generated compound key is used to validate the built code after the end product has been delivered. For example, using the above example source files (i.e., src/abc.c and src/pqr.c), the generated compound key may be:

src/abc.c 4A21 2500B
src/pqr.c 505F 2769B

In step 206, the build system collates the source from the repositories, initiates the build process, and injects the key into the source files. The source can be a file with code to compile, or a binary file, such as pictures or maps. In this exemplary embodiment, key generator 114 generates a key for each file being built, and embeds the generated key into the file. During the build process, the same hash function is executed on each source file, prior to the compilation phase, and the value (i.e., the key) is embedded within the source code itself. During the build process, depending on the type of source, the key is injected either as metadata, or as an entry in the source files, on the files being built. As these are constant or static value fields, the key embedded within the source files is propagated into all of the binary objects where the particular source is built. For example, using the above example source files (i.e., src/abc.c and src/pqr.c), after the build process, source file abc.c and source file pqr.c contain, respectively:

const char* file_key="src/abc.c 4A21 2500B"
const char* file_key="src/pqr.c 505F 2769B"

This ensures that there have been no other modifications to the source file after the extraction process. The value embedded during the build process should eventually match the compound key generated by version control manager 112.

In step 208, a key validation tool and the compound key are packaged with the final deliverables, in order to validate the build keys in the final product. In this exemplary embodiment, key validation tool 122 is supplied along with the product that is used to validate the final binaries using the compound key created by version control manager 112 (i.e., step 204) with the key generated and embedded during the build process (i.e., step 206). In this exemplary embodiment, the key validation tool and the compound key are packaged with the final product as an installable product binary.

In step 210, key validation tool 122 is used to validate the end product deliverables using the generated compound key, before publishing the end product to an end user (i.e., a customer). In this exemplary embodiment, after the installable product binary has been installed in a test machine, key validation tool 122 is used to validate the final product by comparing the supplied compound key and the embedded key generated during the build process, in each binary. Key validation tool 122 scans the compound key, and for each entry in the compound key, key validation tool 122 searches for the entry in the binary files. Once a match is found, the values are compared in order to validate the correctness. In this manner, any incorrect files are detected during the validation process, before the files are uploaded to central fix repository 120 for an end user to download. This process also ensures that the proper level of fix is used when publishing the end product deliverables. For example, using the above example source files (i.e., src/abc.c and src/pqr.c), the first entry in the compound key is:

src/abc.c 4A21 2500B

In this example, key validation tool 122 scans all of the binaries for the entry 'src/abc.c', and a match is found for the 'abcpqr' binary. The corresponding value in the binary is matched with the value from the compound key in order to validate the correctness.

In step 212, the fix is uploaded to central fix repository 120, if no issues are detected during the validation process. In this exemplary embodiment, if no issues are determined when comparing the compound key with the generated keys using key validation tool 122, then the fix is uploaded to central fix repository 120, along with the corresponding compound key. In some embodiments, the compound key can be encrypted before publishing the fix and key validation tool 122 can decrypt the key before validation, if revealing the source code files in the compound key is a concern. End users may then access and download one or more fixes from central fix repository 120.

Figure 3:
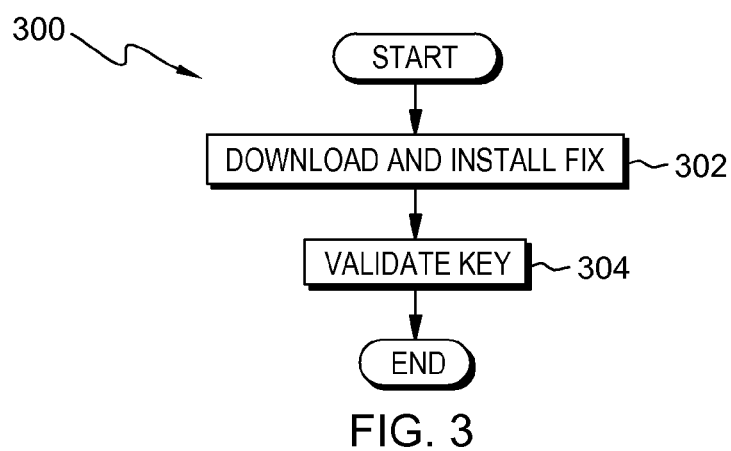
FIG. 3 depicts a flowchart illustrating operational steps of an end user download process from a central fix repository, in accordance with an embodiment of the present invention.

FIG. 3 depicts a flowchart 300 illustrating operational steps of an end user download process from central fix repository 120, in accordance with an embodiment of the present invention.

In step 302, an end user downloads a fix from central fix repository 120, and installs the fix onto end user device 130.

In step 304, the key validation tool 122 is run after the end user installs the product. This allows the end user to validate the installed fix, by comparing the compound key and generated keys using key validation tool 122. The end user may validate that the downloaded fix and the installed fix match the expected source level of the end product (using a method similar to the process described in step 210 of FIG. 2).

By performing the operational steps of FIGS. 2 and 3, the source, build, and end deliverables of a product code can be synchronized, and errors can be readily detected. The process can ensure that the built deliverable matches the intended level of source code at the time of dispatch from the delivery point, as well as, at the end user.

Figure 4:
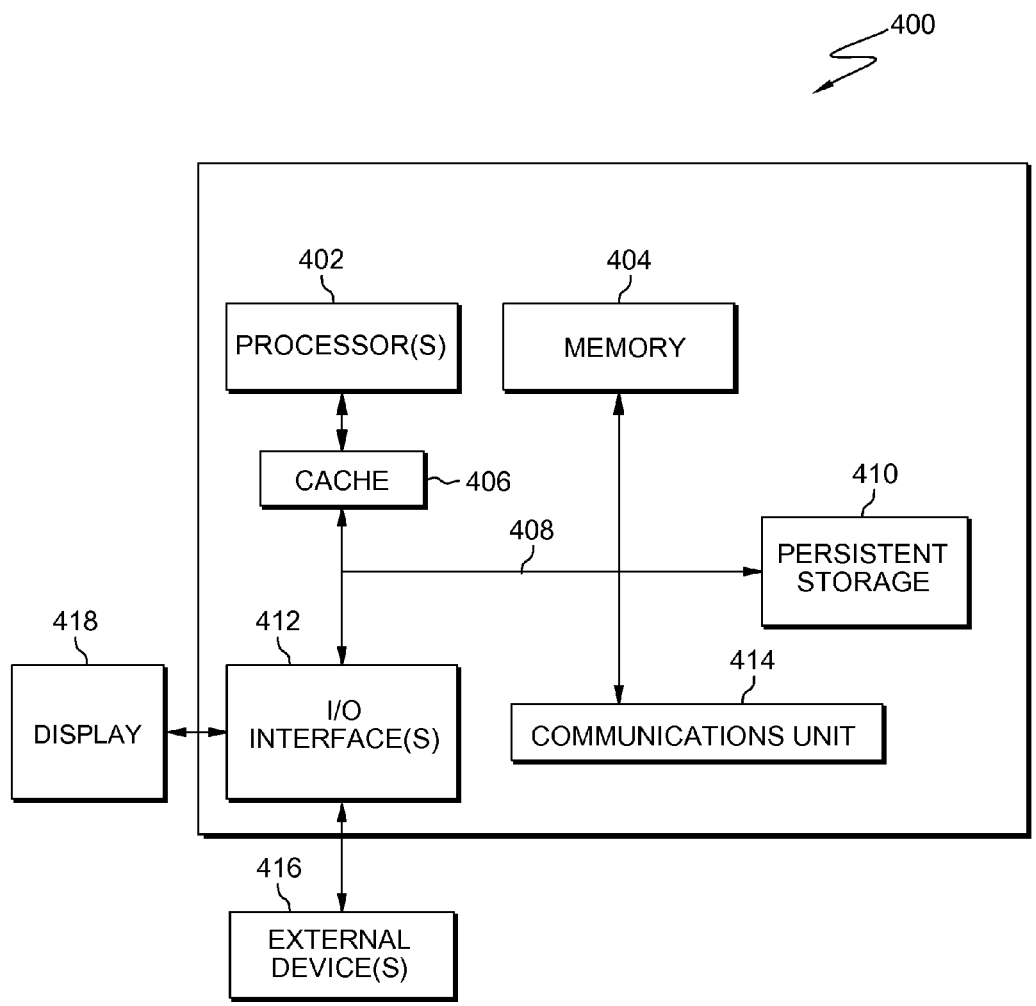
FIG. 4 depicts a block diagram of components of a computing device, in accordance with an illustrative embodiment of the present invention.

FIG. 4 is a block diagram of internal and external components of a computing device, generally designated 400, which is representative of the computing devices of FIG. 1, in accordance with an embodiment of the present invention.

It should be appreciated that FIG. 4 provides only an illustration of one implementation and does not imply any limitations with regard to the environments in which different embodiments may be implemented. Many modifications to the depicted environment may be made.

Computing device 400 includes communications fabric 408, which provides communications between computer processor(s) 402, memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer-readable storage media. In this embodiment, memory 404 includes random access memory (RAM). In general, memory 404 can include any suitable volatile or non-volatile computer readable storage media. Cache 406 is a fast memory that enhances the performance of processors 402 by holding recently accessed data, and data near recently accessed data, from memory 404.

Program instructions and data used to practice embodiments of the present invention may be stored in persistent storage 410 and in memory 404 for execution by one or more of the respective processors 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer-readable storage medium that is also part of persistent storage 410.

Communications unit 414, in these examples, provides for communications with other data processing systems or devices, including resources of network 140. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computing device 400. For example, I/O interface 412 may provide a connection to external devices 416 such as a keyboard, keypad, a touch screen, and/or some other suitable input device. External devices 416 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 410 via I/O interface(s) 412. I/O interface(s) 412 also connect to a display 418.

Display 418 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for authenticating source code, the method comprising:
   extracting, by one or more processors, source code having at least one source file having at least one reserved field;
   generating, by a key generator, a compound key comprising the at least one source file, a hash function run on the at least one source file, and a file size of the at least one source file;
   building, by one or more processors, a set of files, based on the source code from the at least one source file;
   injecting, by one or more processors, a generated value based on the compound key into each file of the built set of files either as metadata or as an entry in the at least one source file;
   comparing, by a key validation tool, the compound key and the generated value to determine if said compound key is equivalent to said generated value;
   producing, by one or more processors, a final product, wherein the final product comprises: the key validation tool and the generated compound key;
   determining, by one or more processors, whether there is a difference between the compound key and the generated value; and
   in response to determining that there is not a difference between the compound key and the value, loading the final product to a repository.

2. The method of claim 1, wherein comparing, by the key validation tool, the compound key and the value to determine if said compound key is equivalent to said value comprises:
   scanning, by the key validation tool, the compound key;
   for a compound key entry, searching, by the key validation tool, the set of files for an entry which matches the entry in the compound key; and
   responsive to detecting an entry in the set of files which matches the entry in the compound key, comparing a value associated with the entry in the set of files to a value associated with the entry in the compound key, to determine if the value associated with the entry in the set of files is equivalent to the value associated with the entry in the compound key.

3. The method of claim 1, wherein extracting, by one or more processors, source code having at least one source file having at least one reserve field-comprises:
   adding, by a manager, a row to the compound key, wherein the row comprises:
   a source path; and
   information associated with the at least one source file.

4. The method of claim 1, further comprising:
   receiving, by a manager, the source code from the at least one source file; and
   generating, by the manager, a unique key for the at least one source file, wherein the unique key comprises information associated with the at least one source file.

5. A computer program product for authenticating source code, the computer program product comprising:
   a computer readable storage medium and program instructions stored on the computer readable storage medium, the program instructions comprising:
   program instructions to extract source code having at least one source file having at least one reserved field;
   program instructions to generate a compound key comprising the at least one source file, a hash function run on the at least one source file, and a file size of the at least one source file;
   program instructions to build a set of files, based on the source code from the at least one source file;
   program instructions to inject a generated value based on the compound key into each file of the built set of files either as metadata or as an entry in the at least one source file;
   program instructions to compare the compound key and the value to determine if said compound key is equivalent to said generated value;
   program instructions to produce a final product, wherein the final product comprises: a key validation tool and the generated compound key;
   program instructions to determine whether there is a difference between the compound key and the generated value; and
   program instructions to, in response to determining that there is not a difference between the compound key and the value, load the final product to a repository.

6. The computer program product of claim 5, wherein the program instructions to compare the compound key and the value to determine if said compound key is equivalent to said value comprise:
   program instructions to scan the compound key;
   program instructions to, for a compound key entry, search the set of files for an entry which matches the entry in the compound key; and
   program instructions to, responsive to detecting an entry in the set of files which matches the entry in the compound key, compare a value associated with the entry in the set of files to a value associated with the entry in the compound key, to determine if the value associated with the entry in the set of files is equivalent to the value associated with the entry in the compound key.

7. The computer program product of claim 5, wherein extracting, by one or more processors, source code having at least one source file having at least one reserve field comprises:
   program instructions to add a row to the compound key, wherein the row comprises:
   a source path; and
   information associated with the at least one source file.

8. The computer program product of claim 5, further comprising:
   program instructions to receive the source code from the at least one source file; and
   program instructions to generate a unique key for the at least one source file, wherein the unique key comprises information associated with the at least one source file.

9. A system for authenticating source code, the system comprising:
   one or more computer processors;
   one or more computer readable storage media;

program instructions to extract source code having at least one source file having at least one reserved field;

program instructions to generate a compound key comprising the at least one source file, a hash function run on the at least one source file, and a file size of the at least one source file;

program instructions to build a set of files, based on the source code from the at least one source file;

program instructions to inject a generated value based on the compound key into each file of the built set of files either as metadata or as an entry in the at least one source file;

program instructions to compare the compound key and the value to determine if said compound key is equivalent to said generated value;

program instructions to produce a final product, wherein the final product comprises: a key validation tool and the generated compound key;

program instructions to determine whether there is a difference between the compound key and the generated value; and program instructions to, in response to determining that there is not a difference between the compound key and the value, load the final product to a repository.

10. The system of claim 9, wherein the program instructions to compare the compound key and the value to determine if said compound key is equivalent to said value comprise:

program instructions to scan the compound key;

program instructions to, for a compound key entry, search the set of files for an entry which matches the entry in the compound key; and program instructions to, responsive to detecting an entry in the set of files which matches the entry in the compound key, compare a value associated with the entry in the set of files to a value associated with the entry in the compound key, to determine if the value associated with the entry in the set of files is equivalent to the value associated with the entry in the compound key.

11. The system of claim 9, further comprising:

program instructions to receive the source code from the at least one source file; and program instructions to generate a unique key for the at least one source file, wherein the unique key comprises information associated with the at least one source file.

* * * * *